March 25, 1952 — J. A. CAMPBELL — 2,590,680
APPARATUS FOR LIQUID LEVEL CONTROLS
Filed Feb. 28, 1949
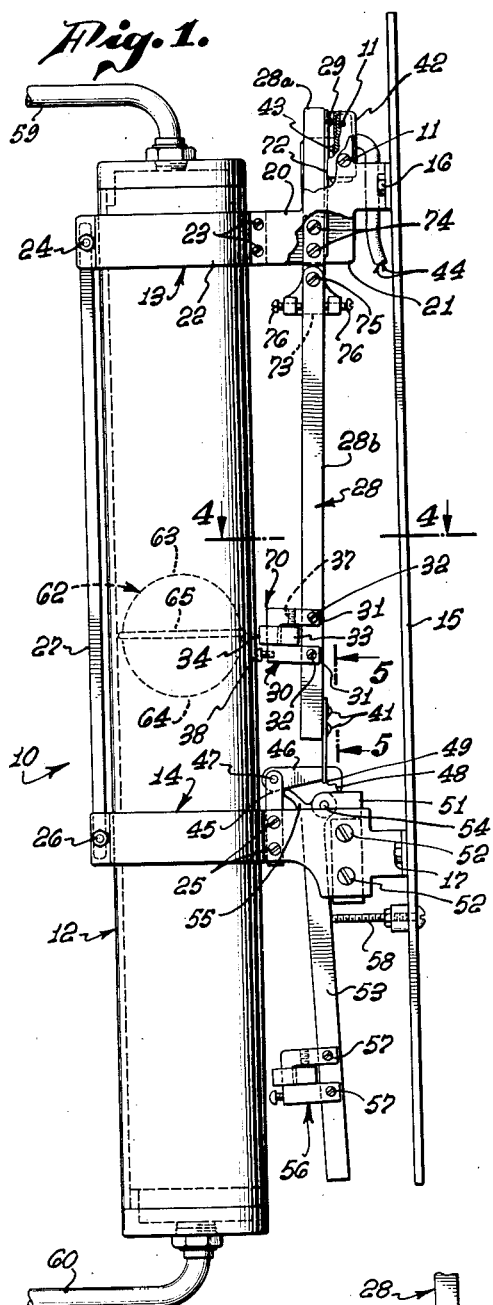
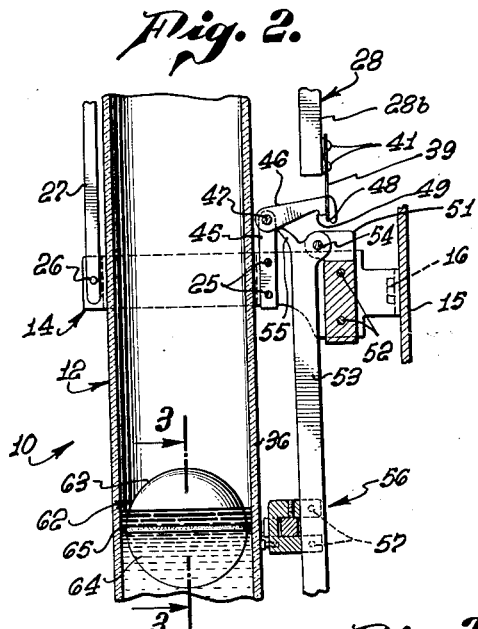
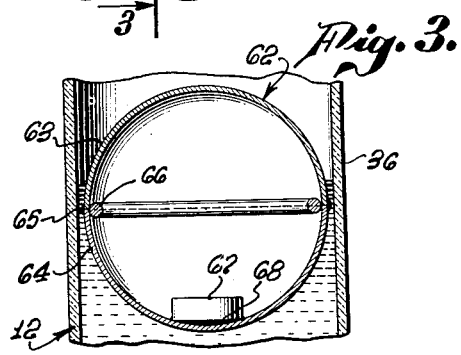
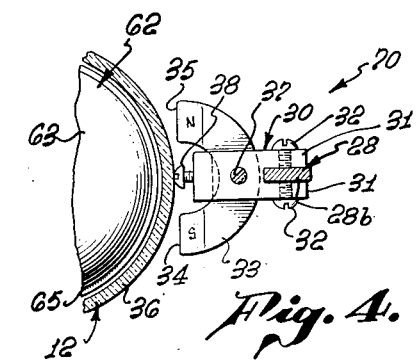
INVENTOR.
JULIAN A. CAMPBELL,
BY
ATTORNEY.

Patented Mar. 25, 1952

2,590,680

UNITED STATES PATENT OFFICE 2,590,680

APPARATUS FOR LIQUID LEVEL CONTROLS

Julian A. Campbell, Long Beach, Calif.

Application February 28, 1949, Serial No. 78,717

7 Claims. (Cl. 172—284)

This invention relates generally to improved liquid level controlling apparatus and concerns specifically novel magnetically actuated devices for maintaining the level of a liquid between predetermined limits.

In many situations, it is desirable to automatically control the volume or surge range of liquid in a container by maintaining the liquid between predetermined upper and lower levels. Typically in a steam plant, it is necessary to control the amount of condensate in a condensate collecting tank by periodically withdrawing the slowly accumulating water for return to the boiler feed system. A major object of the present invention is to provide control apparatus for such a system operable to automatically energize a transfer pump upon accumulation of a predetermined amount of condensate, to withdraw a quantity of the condensate from the tank. This may be effected by the employment of a magnetic metal member movable vertically in a chamber in accordance with changes in the liquid level, together with means operable by transmission of magnetic force through the closed side wall of the chamber to actuate a control element in opposite directions upon arrival of the liquid level successively at a pair of limiting elevations.

Preferably, I employ a pair of movable magnets located at the outside of the chamber at vertically spaced locations and each adapted to be automatically attracted by the magnetic metal member within the chamber as it is carried, by changes of liquid level, into the vicinity of the magnet.

An additional object of the invention is to provide apparatus operable to maintain energization of a pump or the like after arrival of a liquid at a predetermined level and until a second level is attained. For this purpose, holding means, such as a latch, may be employed to retain a control element in an operative position to which it is automatically displaced upon arrival of the liquid at one of the two critical levels. Arrival at the second level may then release the holding means for return of the control element to a normal position.

A further object is to provide a magnetically actuated level control apparatus in which a critical level at which the device reacts may be varied over a relatively wide range by adjusting the vertical position of a magnetic element along a movable control element.

In previous magnetically actuated level control devices, the level-following magnetic metal member has been susceptible to corrosion as a result of its direct engagement with the supporting liquid. In accordance with the invention, I prevent such deterioration of the member by the use of a non-magnetic float which completely houses the member and thus protects it against any contact with the liquid.

If the movable and stationary magnetic elements of a liquid level control are permitted to come too closely together, the magnetic attraction may become so intense as to cause the movable element to hang up, i. e., to remain in a single location without responding to further level changes. To prevent this result, I form the non-magnetic float shell about the movable magnetic member in a manner such that the shell spaces the member from the chamber wall and therefore from the outer magnet a distance preventing undue attraction.

Preferably, the float is in the form of a sectional spherical shell, and the magnetic member is an annular ring having an external diameter approximately equal to the internal diameter of the shell. In accordance with the invention, a weight may be disposed within the shell in novel relation to the annular ring for maintaining the ring in an approximately horizotal plane at all times.

The above and further features and objects of the present invention will be better understood from the following detailed description of the typical embodiment illustrated in the accompanying drawing, in which:

Fig. 1 is a side elevation of apparatus for controlling the liquid level in a condensate collecting tank;

Fig. 2 is a fragmentary sectional view of the apparatus shown in Fig. 1, with the liquid level at its lower limit;

Fig. 3 is an enlarged fragmentary vertical section through the float taken on line 3—3 of Fig. 2;

Fig. 4 is an enlarged fragmentary horizontal section taken on line 4—4 of Fig. 1, and showing one of the magnets; and Fig. 5 is an enlarged fragmentary view taken on line 5—5 of Fig. 1.

The illustrated liquid level control, generally indicated at 10, is particularly adapted to control the liquid level in a conventional condensate collecting tank (not shown). Vertically extending cylindrical chamber 12 is disposed at the side of the tank and is in communication with the tank at its upper and lower ends through conduits 59 and 60, respectively. By virtue of these interconnecting conduits, the water level within the chamber 12 corresponds at all times to that within the tank.

The chamber contains a spherical non-magnetic float 62, which comprises a pair of hemispherical shell sections 63 and 64, secured together in fluid-tight relation, as by annularly brazing with non-magnetic material at 65, (see Fig. 3).

Magnetic ring 66, having an external diameter approximately equal to the internal diameter of the float shell, is contained within the float, the defined dimensional relation serving to retain the ring in the illustrated position. Weight 67 is secured within the lower hemispherical shell section 64 at its bottom, as by welding at 68.

Float chamber 12 carries a pair of vertically spaced bracket assemblies 13 and 14, which, in turn, carry outer plate 15, as by bolts 16 and 17, respectively. Bracket assembly 13 comprises a pair of spaced plate-like members 20 and 21 of corresponding configuration and having curved outer strap portions 22 extending arcuately about opposite sides of chamber 12. Fasteners 23 and 24 secure members 20 and 21 together at apposite sides of chamber 12 to tightly clamp the chamber between the two curved portions 22. Bracket 14 includes a similar pair of spaced-like members extending about the chamber and secured together at either side of the chamber by fasteners 25 and 26. Vertical brace 27 rigidly interconnects the inner ends of the two bracket assemblies, being secured to the brackets by fasteners 24 and 26.

Plates 20 and 21 carry between them a conventional micro switch 42, secured to the plates by screw bolts 11. Switch 42 pivotally carries depending arm 28 at 29 through strap or bearing element 72, which is rigidly secured to the side of the arm in any suitable manner. The arm is formed as a pair of sections 28a and 28b, whose relative positions are controlled by linking element 73. This element is secured to upper arm section 28a by screw bolts 74, and pivotally carries section 28b, as by screw bolt 75. At opposite sides of section 28b, element 73 carries a pair of inwardly facing screws whose inner ends engage section 28b to retain it in any desired angular position relative to section 28a.

The lower section of the arm carries magnet assembly 70, which includes U-shaped bracket 30, having bifurcated ends 31, (see Fig. 4), within which arm 28 is slidably receivable. Set screws 32, carried by the bifurcated ends of bracket 30, may be tightened against the sides of the arm 28 to retain the magnet assembly at any vertical position along the arm. Magnet 33 extends through bracket 30, presenting its poles 34 and 35 near non-magnetic side wall 36 of chamber 12. Set screw 37 extends through bracket 30 to bear against the magnet and thus secure it rigidly to the bracket. Screw 38, carried by bracket 30, acts as an adjustable stop to limit leftward movement of the magnet. At its lower end, arm 28 carries depending latch keeper 39, which has an inner vertical slot 40 for reception of latch 46, as will be brought out later. The latch keeper may be secured to arm 28 by a pair of screws 41.

Switch 42 has an actuating pin 43 engaged and operated by arm 28 to control an electric circuit supplying current to a condensate transfer pump. With arm 28 in the position of Fig. 1, pin 43 is permitted to move slightly to the left to close a circuit including leads 44 and energize the pump, which then withdraws water from the condensate tank. Upon subsequent movement of arm 28 to the right, the switch is opened and the pump de-energized.

Bracket assembly 14 carries, as by screws 25, an upstanding bearing member 45, which pivotally carries latch arm 46 at 47. This latch is relatively thin for reception within slot 40 of keeper 39, and has a pair of shoulders 48 and 49 engageable, in different positions of arm 28, with the lower end or cross piece 50 of the keeper. Assembly 14 also carries a second bearing member 51, by screws 52, the bearing in turn pivotally supporting arm 53 at 54. This arm has an angularly projecting finger 55 engageable with the underside of latch 46 and operable to pivot the latch upwardly upon leftward movement of the arm. Lower magnet assembly 56, corresponding structurally to upper magnet assembly 70, is carried by arm 53, and is rendered adjustable by screws 57 to any vertical position along the arm. Stop 58, carried by plate 15, acts to limit rightward movement of arm 53. As will be understood, since magnet assemblies 70 and 56 are both carried to the left of their respective arms and the arms are both pivoted about points offset to the right of their center lines, the center of gravity of each arm and its carried parts is such as to normally urge the arm to the right and away from the chamber wall.

In use, the illustrated apparatus is operable to control a condensate transferring pump to maintain the condensate level in the tank and in chamber 12 at all times between those levels illustrated in Figs. 1 and 2. Fig. 1 shows the liquid level at its highest elevation, in which condition float 62 is raised to a point at which ring 66 is disposed opposite the poles of magnet 33, to attract the magnet to the left. Such leftward movement of the upper magnet effects similar deflection of arm 28, to close switch 42 and the circuit to the condensate transfer pump. The pump is energized to withdraw a portion of the water from the condensate tank and slowly lower the condensate level to the elevation of Fig. 2. Upon arrival of the liquid level at this latter elevation, magnetic metal ring 66 attracts magnet assembly 56 to the left to pivot arm 53 to the position of Fig. 2. Such pivotal movement of arm 53 raises latch 46 through finger 55 to permit rightward movement of keeper 39 and arm 28, which in turn opens the switch and the pump circuit to stop the withdrawal of the condensate. The condensate then accumulates within the tank and chamber 12 until it has again risen to the level of Fig. 1 at which point the described withdrawing cycle is repeated. Screws 76 of linking element 73 may be adjusted to precisely determine the particular position of magnet assembly 70 at which the switch is actuated.

Enclosure of magnetic ring 66 within the float protects the member from engagement with the condensate, and thus prevents any injury to the ring which might be caused by such contact. Further, the non-magnetic shell spaces the ring from the chamber side wall a distance corresponding to the thickness of the shell and brazed connection 65, to maintain the ring sufficiently far from either of the actuating magnets to prevent any hanging up of the float as a result of magnetic attraction. Thus, relatively strong magnets may be employed without interferring with the level following action of the float.

I claim:

1. A liquid level control comprising walls forming a liquid container chamber, a control element mounted for movement between a pair of positions, means operable in response to a change in the liquid level in said chamber to actuate the control element from a first one of said positions to the second, a movable latch member operable to retain said element in said second position, and means operable in response to a change in the liquid level in the chamber to release said latch member and permit return of the element to said first position.

2. A liquid level control comprising walls forming a liquid container chamber, a control element mounted for movement between a pair of control positions, means operable by transmission of magnetic force through a closed side wall of said chamber to actuate the control element from a first position to a second position in response to a change in the liquid level in the chamber to a predetermined height, a holding part operable to retain said element in said second position, and means operable by transmission of magnetic force through said wall to release said holding part in response to a change in the liquid level to a second predetermined height.

3. A liquid level control comprising walls forming a liquid chamber, a member in said chamber movable vertically in accordance with changes in the liquid level therein, a movable control element at the outside of said chamber, means responsive to movement of said member to actuate said control element from a first position to a second position upon a rise of the liquid level in said chamber to a predetermined elevation, a holding part operable to maintain said control element in said second position after such actuation, and means responsive to movement of said member to release said holding part and permit return of the control element to said first position upon a fall of the liquid level in the chamber to a second and lower predetermined elevation.

4. A liquid level control comprising walls forming a liquid chamber, a magnetic metal member in said chamber movable vertically in accordance with changes in the liquid level therein, a movable control element at the outside of said chamber, means operable by transmission of magnetic force through the closed side wall of said chamber to actuate said control element from a first position to a second position in response to movement of said member by the liquid to a predetermined elevation, a holding part operable to maintain said control element in said second position after such actuation, and means operable by transmission of magnetic force through said side wall to release the holding part to permit return of the control element to said first position in response to movement of said member by the liquid to a second and different predetermined elevation.

5. A liquid level control comprising walls forming a liquid chamber, a magnetic metal member in said chamber movable vertically in accordance with changes in the liquid level therein, a movable control element at the outside of said chamber, means including a first movable magnet at the outside of said chamber operable by transmission of magnetic force through the closed side wall of said chamber and to said member to actuate said control element from a first position to a second position in response to a change in the liquid level in said chamber to a predetermined elevation, a holding part operable to maintain said control element in said second position after such movement, and means including a second movable magnet at the outside of the chamber and operable by transmission of magnetic force through said side wall to release said holding part to permit return of said control element to said first position in response to a change in the liquid level in said chamber to a second and different predetermined elevation.

6. A liquid level control comprising walls forming a liquid chamber, a magnetic metal member in said chamber movable vertically in accordance with changes in the liquid level therein, an arm mounted at the ouside of said chamber for swinging movement toward and away from a closed side wall of the chamber, a first movable magnet carried by said arm for movement therewith and operable by transmission of magnetic force through said side wall of the chamber and to said member to actuate the arm from an inner position to an outer position in response to a change in the liquid level in said chamber to a predetermined elevation, a holding part operable to maintain said arm in said outer position after such actuation, and means including a second movable magnet below said first magnet and operable by transmission of magnetic force through said side wall to release said holding part to permit return of the arm to said inner position in response to a change in the liquid level in said chamber to a second and different predetermined elevation.

7. A liquid level control comprising walls forming a liquid chamber, a float carried magnetic metal member in said chamber movable vertically in accordance with changes in the liquid level therein, a first depending swinging arm at the outside of said chamber movable toward and away from a closed side wall of the chamber and normally urged toward an outer position, a first magnet carried by said arm and movable toward and away from the chamber therewith, said magnet being operable by transmission of magnetic force through said side wall of the chamber and to said member to actuate said arm from said outer position to an inner position in response to a rise of the liquid level in the chamber to a first predetermined elevation, a latch engageable with a lower portion of said arm to maintain it in said inner position, a second depending swinging arm at the outside of said chamber beneath the first arm, said second arm being movable toward and away from said side wall of the chamber and normally urged to an outer position, means carried by the upper end of said second arm and operable to release said latch upon inward movement of the second arm toward the chamber wall, a second magnet carried by said second arm and movable therewith, said magnet being operable by transmission of magnetic force through said side wall and to said member to move said second arm inwardly to release the latch in response to a fall of the liquid level to a second and lower elevation.

JULIAN A. CAMPBELL.

REFERENCES CITED

The following references are of record in the file of this patent:

UNITED STATES PATENTS

| Number | Name | Date |
|---|---|---|
| 355,815 | Ghegan | Jan. 11, 1887 |
| 551,540 | Fowler | Dec. 17, 1895 |
| 1,491,487 | Means | Apr. 22, 1924 |
| 1,949,371 | Dillman | Feb. 27, 1934 |
| 2,440,987 | Thompson | May 4, 1948 |
| 2,448,251 | Campbell | Aug. 31, 1948 |
| 2,467,073 | Binford | Apr. 12, 1949 |